US012033527B2

(12) United States Patent
Matsuno (10) Patent No.: US 12,033,527 B2
(45) Date of Patent: Jul. 9, 2024

(54) PROGRAM, INFORMATION PROCESSING APPARATUS, AND INFORMATION PROCESSING METHOD

(71) Applicant: JAPAN AEROSPACE EXPLORATION AGENCY, Tokyo (JP)

(72) Inventor: Yoshinori Matsuno, Tokyo (JP)

(73) Assignee: Japan Aerospace Exploration Agency, Tokyo (JP)

(*) Notice: Subject to any disclaimer, the term of this patent is extended or adjusted under 35 U.S.C. 154(b) by 497 days.

(21) Appl. No.: 17/416,265

(22) PCT Filed: Aug. 29, 2019

(86) PCT No.: PCT/JP2019/033863
§ 371 (c)(1),
(2) Date: Jun. 18, 2021

(87) PCT Pub. No.: WO2020/129315
PCT Pub. Date: Jun. 25, 2020

(65) Prior Publication Data
US 2022/0051575 A1  Feb. 17, 2022

(30) Foreign Application Priority Data

Dec. 20, 2018 (JP) .............................. JP2018-237900

(51) Int. Cl.
*G08G 5/00* (2006.01)
(52) U.S. Cl.
CPC ........... *G08G 5/0091* (2013.01); *G08G 5/003* (2013.01)
(58) Field of Classification Search
CPC ........... B64C 13/18; B64D 45/00; B64F 1/36; G08G 5/0021; G08G 5/003; G08G 5/0052; G08G 5/0091
See application file for complete search history.

(56) References Cited

U.S. PATENT DOCUMENTS

| 5,121,325 A | 6/1992 | DeJonge |
| 8,150,588 B2 | 4/2012 | Klooster |

(Continued)

FOREIGN PATENT DOCUMENTS

| JP | 2012-510108 A | 4/2012 |
| JP | 2012-174270 A | 9/2012 |

(Continued)

OTHER PUBLICATIONS

Office Action dated Aug. 8, 2022 in Japanese Application No. 2018-237900.

(Continued)

*Primary Examiner* — Dale Moyer
(74) *Attorney, Agent, or Firm* — Saliwanchik, Lloyd & Eisenschenk (57) ABSTRACT

[Object] To suppress the influence of uncertainties on a time of arrival while reducing the number of speed adjustments or the like to suppress the deterioration of fuel efficiency and comfort.

[Solving Means] An information processing apparatus 1 includes: an uncertainty estimation unit 11 that quantifies, using an actual measured value, an uncertain predicted value that affects a time of arrival at a target point of a mobile object, and calculates a probability distribution of the uncertain predicted value; an estimated-time-of-arrival estimation unit 12 that calculates, using the probability distribution of the uncertain predicted value, a probability distribution of an estimated time of arrival at the target point when a current control input is used, the control input being a control input to the mobile object and affecting the time of arrival at the target point; and a time-of-arrival control unit 13 that determines, in the probability distribution of the estimated time of arrival at the target point, whether a first statistic of the estimated time of arrival with respect to a required time (Continued)

of arrival at the target point when the current control input is used falls outside a first threshold, and sets the control input to increase a possibility that a second statistic of the estimated time of arrival with respect to the required time of arrival is within an allowable range in the probability distribution of the estimated time of arrival at the target point if the first statistic falls outside the first threshold.

15 Claims, 6 Drawing Sheets

(56) References Cited

U.S. PATENT DOCUMENTS

| | | | |
|---|---|---|---|
| 8,862,287 B1 | 10/2014 | Clark et al. | |
| 9,193,442 B1* | 11/2015 | Young | G08G 5/003 |
| 2010/0131124 A1 | 5/2010 | Klooster | |
| 2012/0215435 A1 | 8/2012 | Subbu et al. | |
| 2013/0226373 A1 | 8/2013 | Bollapragada et al. | |
| 2014/0088799 A1* | 3/2014 | Tino | G06F 30/20 703/2 |
| 2016/0343258 A1 | 11/2016 | Navarro et al. | |
| 2017/0249849 A1 | 8/2017 | De Prins et al. | |
| 2018/0045854 A1* | 2/2018 | Kneuper | G06Q 10/047 |

FOREIGN PATENT DOCUMENTS

| | | |
|---|---|---|
| JP | 2013-177120 A | 9/2013 |
| JP | 2017-503272 A | 1/2017 |

OTHER PUBLICATIONS

International Search Report dated Nov. 26, 2019 in International Application No. PCT/JP2019/033863.
Kikuchi, R. et al., "Nowcasting algorithm for wind fields using ensemble forecasting and aircraft flight data," *Meteorological Applications*, Wiley Online Library, 2017, pp. 1-11, Royal Meteorological Society.

* cited by examiner

PROGRAM, INFORMATION PROCESSING APPARATUS, AND INFORMATION PROCESSING METHOD

CROSS-REFERENCE TO RELATED APPLICATIONS

This application is the U.S. national stage application of International Patent Application No. PCT/JP2019/033863, filed Aug. 29, 2019, which claims the benefit under 35 U.S.C. § 119 of Japanese Application No. 2018-237900, filed Dec. 20, 2018, the disclosures of each of which are incorporated herein by reference in their entirety.

TECHNICAL FIELD

The present invention relates to a program, an information processing apparatus, and an information processing method for setting optimal control inputs (speed, altitude, path angle, cost index, rate of climb and descent, etc.) that satisfy a required time of arrival at any target point on a flight path, for example, in consideration of uncertainties (weather prediction error, aircraft characteristic error, etc.) during a flight.

BACKGROUND ART

In order to perform high-density flight operation with an increase in air traffic demand, time-based air traffic flow management is necessary, that is, an aircraft needs to pass through a target point at a requested time. This needs a time-of-arrival controlling technique of predicting an estimated time of arrival and controlling the flying speed to satisfy a required time of arrival (see Patent Literature 1).

Further, since it is difficult to accurately predict an estimated time of arrival due to the influence of uncertainties such as weather prediction errors generated during a flight, a time-of-arrival control technique of quantifying uncertainties of the time of arrival and using the uncertainties has also been proposed (see Patent Literature 2).

CITATION LIST

Patent Literature

Patent Literature 1: U.S. Pat. No. 5,121,325
Patent Literature 2: U.S. Pat. No. 8,150,588

Non-Patent Literature

Non-Patent Literature 1: "Nowcasting algorithm for wind fields using ensemble forecasting and aircraft flight data", Ryota Kikuchi et al., 2017, Meteorological Applications

DISCLOSURE OF INVENTION

Technical Problem

In the technique described in Patent Literature 1, the speed adjustment is performed with high frequency and acceleration and deceleration are repeated due to the influence of uncertainties during a flight, and thus fuel consumption and comfort are deteriorated. Further, also in the technique described in Patent Literature 2, the bang-bang control is performed in which only switching between a minimum allowable speed and a maximum allowable speed that are determined in advance is assumed, and thus fuel consumption and comfort are deteriorated. Consequently, the techniques described in Patent Literatures 1 and 2 have poor practicability.

In view of the circumstances as described above, it is an object of the present invention to provide a program, an information processing apparatus, and an information processing method that are capable of suppressing the influence of uncertainties on a time of arrival while reducing the number of speed adjustments or the like to suppress the deterioration of fuel efficiency and comfort.

Solution to Problem

In order to achieve the above object, a program according to an embodiment of the present invention causes a computer to execute the steps of: quantifying, using an actual measured value, an uncertain predicted value that affects a time of arrival at a target point of a mobile object, and calculating a probability distribution of the uncertain predicted value; calculating, using the probability distribution of the uncertain predicted value, a probability distribution of an estimated time of arrival at the target point when a current control input is used, the control input being a control input to the mobile object and affecting the time of arrival at the target point; determining, in the probability distribution of the estimated time of arrival at the target point, whether a first statistic of the estimated time of arrival with respect to a required time of arrival at the target point when the current control input is used falls outside a first threshold; and setting the control input to increase a possibility that a second statistic of the estimated time of arrival with respect to the required time of arrival is within an allowable range in the probability distribution of the estimated time of arrival at the target point if the first statistic falls outside the first threshold.

In the present invention, time management is robustly performed on the uncertain predicted value that affects the time of arrival at the target point of the mobile object, that is, on the uncertainty with respect to the time of arrival, so that it is possible to suppress the influence of uncertainties on a time of arrival while reducing the number of speed adjustments or the like to suppress the deterioration of fuel efficiency and comfort.

In the program according to an embodiment of the present invention, the setting the control input may include setting the control input to increase the possibility that the second statistic is within the allowable range in the probability distribution of the estimated time of arrival at the target point and to optimize a predetermined cost, if the first statistic falls outside the first threshold.

In the program according to an embodiment of the present invention, each of the first statistic and the second statistic may be at least one of a probability, a moment, or a representative value in the probability distribution of the estimated time of arrival with respect to the required time of arrival.

In the program according to an embodiment of the present invention, the mobile object may be an aircraft, the uncertain predicted value may be a weather prediction value and/or an aircraft characteristic, and the actual measured value may be a weather observation value for the weather prediction value, and is an aircraft measurement value for the aircraft characteristic.

In the program according to an embodiment of the present invention, the mobile object may be an aircraft, and the control input to the aircraft may be at least one of a speed, an altitude, a path angle, a cost index, or a rate of climb and descent.

An information processing apparatus according to an embodiment of the present invention includes: an uncertainty estimation unit that quantifies, using an actual measured value, an uncertain predicted value that affects a time of arrival at a target point of a mobile object, and calculates a probability distribution of the uncertain predicted value; an estimated-time-of-arrival estimation unit that calculates, using the probability distribution of the uncertain predicted value, a probability distribution of an estimated time of arrival at the target point when a current control input is used, the control input being a control input to the mobile object and affecting the time of arrival at the target point; and a time-of-arrival control unit that determines, in the probability distribution of the estimated time of arrival at the target point, whether a first statistic of the estimated time of arrival with respect to a required time of arrival at the target point when the current control input is used falls outside a first threshold, and sets the control input to increase a possibility that a second statistic of the estimated time of arrival with respect to the required time of arrival is within an allowable range in the probability distribution of the estimated time of arrival at the target point if the first statistic falls outside the first threshold.

An information processing method according to an embodiment of the present invention includes: quantifying, using an actual measured value, an uncertain predicted value that affects a time of arrival at a target point of a mobile object, and calculating a probability distribution of the uncertain predicted value; calculating, using the probability distribution of the uncertain predicted value, a probability distribution of an estimated time of arrival at the target point when a current control input is used, the control input being a control input to the mobile object and affecting the time of arrival at the target point; determining, in the probability distribution of the estimated time of arrival at the target point, whether a first statistic of the estimated time of arrival with respect to a required time of arrival at the target point when the current control input is used falls outside a first threshold; and setting the control input to increase a possibility that a second statistic of the estimated time of arrival with respect to the required time of arrival is within an allowable range in the probability distribution of the estimated time of arrival at the target point if the first statistic falls outside the first threshold.

Advantageous Effects of Invention

According to the present invention, it is possible to suppress the influence of uncertainties on a time of arrival while reducing the number of speed adjustments or the like to suppress the deterioration of fuel efficiency and comfort.

MODE(S) FOR CARRYING OUT THE INVENTION

Hereinafter, an embodiment of the present invention will be described with reference to the drawings.

Figure 1:
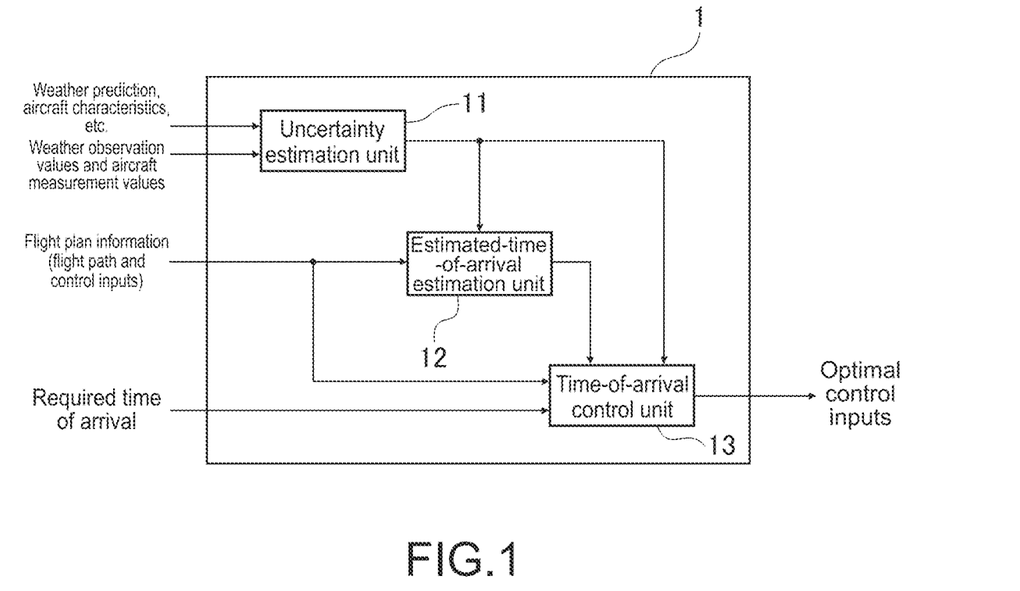
FIG. 1 is a block diagram showing a configuration of an information processing apparatus 1 according to an embodiment of the present invention.

FIG. 1 is a block diagram showing a configuration of an information processing apparatus according to an embodiment of the present invention.

An information processing apparatus 1 shown in FIG. 1 corrects uncertainties during a flight and quantifies residual errors while using flight data or the like of its own aircraft or a surrounding aircraft, which is obtained during the flight via an existing on-board device or a data link, by weather prediction correction and error generation techniques (see Non-Patent Literature 1), for example.

The information processing apparatus 1 utilizes the correction information and error information thus generated during the flight, to set optimal control inputs (speed, altitude, path angle, cost index, rate of climb and descent, etc.) such that a time of arrival falls within a target accuracy in consideration of the influence of the quantified uncertainties. In other words, the information processing apparatus 1 sets optimal control inputs (speed, altitude, path angle, cost index, rate of climb and descent, etc.) that satisfy a required time of arrival at any target point on a flight path in consideration of uncertainties (weather prediction error, aircraft characteristic error, etc.) during the flight.

The optimal control inputs are calculated using an on-board device. The set optimal control inputs are directly transmitted to an aircraft control system to automatically guide and control the aircraft, or transmitted to the pilot via, for example, a display device of an on-board electronic flight bag (EFB) to assist the pilot in making operational decisions.

In other words, the information processing apparatus 1 typically includes an application program of the on-board device of the aircraft or an application program of the EFB. The information processing apparatus 1 includes an uncertainty estimation unit 11, an estimated-time-of-arrival estimation unit 12, and a time-of-arrival control unit 13.

The uncertainty estimation unit 11 quantifies an uncertain predicted value during the flight, which affects a time of arrival at a target point of the aircraft, by using an actual measured value and calculates a probability distribution of the uncertain predicted value.

Here, the uncertain predicted value that affects a time of arrival is typically weather prediction, more specifically, predicted wind speed, wind direction, and temperature. The actual measured value is, for example, a weather observation value, more specifically, the wind speed, wind direction, and temperature actually observed on the aircraft. The uncertain predicted value described above also includes aircraft characteristics and the like in addition to the weather prediction value. More particularly, the aircraft characteristics are a fuel flow rate, engine parameters, thrust, and aerodynamic force. The actual measured value is an aircraft measurement value for the aircraft characteristics. In the following description, only the weather prediction will be exemplified as the predicted value, but a combination with the aircraft characteristics, the aircraft characteristics alone, or the like may be set as the uncertain predicted value. Further, the control input to the aircraft is typically a flying speed of the aircraft. In addition to the flying speed of the aircraft, the control input to the aircraft includes an altitude, a path angle, a cost index, a rate of climb and descent, and the like. Further, the control input to the aircraft includes two or more of them. Furthermore, the control input may be time-variant or time-invariant.

Figure 2:
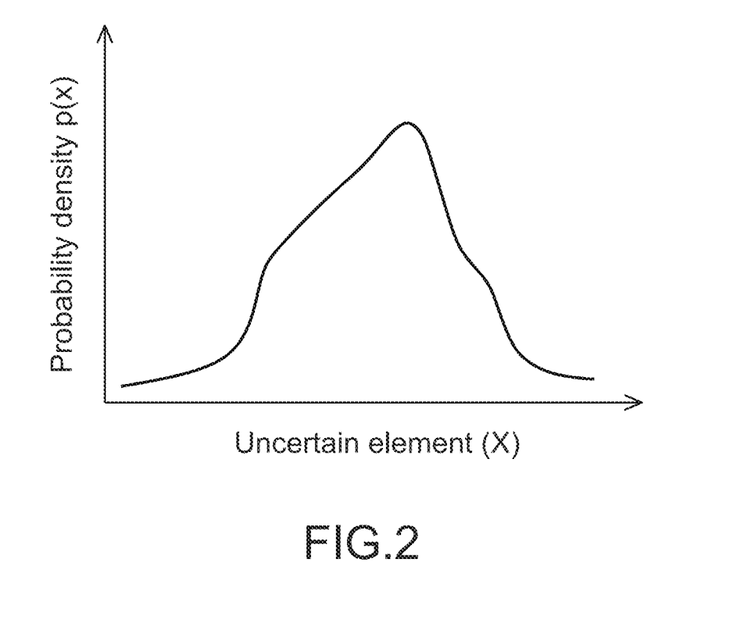
FIG. 2 is a graph showing an exemplary probability distribution of an uncertain element (continuous probability distribution).

FIG. 2 shows an exemplary probability distribution of an uncertain predicted value, that is, an uncertain element. The probability distribution of an uncertain element is generated by quantifying a weather prediction error, which is the difference between a weather prediction value and a weather observation value, i.e., an actual measured value. For example, probabilities (p(x_1), p(x_2), ..., p(x_N)) of weather prediction of N patterns (x_1, x_2, ..., x_N) input in advance are calculated using a weather observation value (x_obs). Note that FIG. 2 exemplifies a continuous probability distribution, but a discrete probability distribution may also be generated as shown in FIG. 3.

Figure 3:
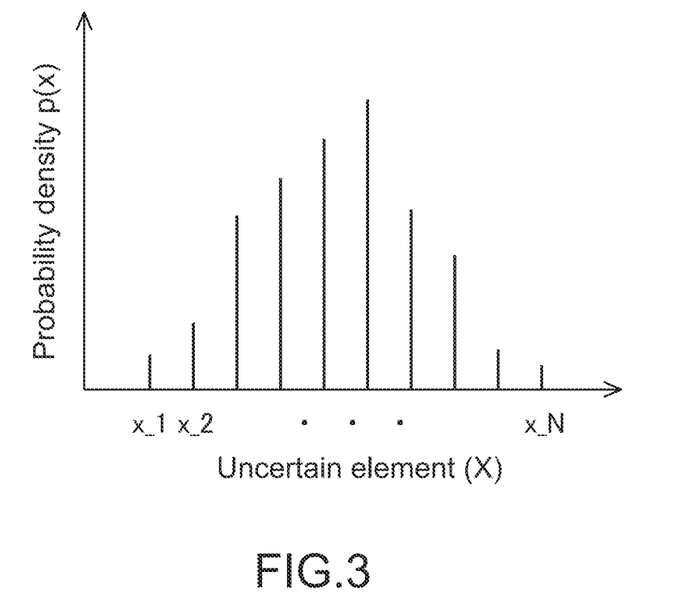
FIG. 3 is a graph showing an exemplary probability distribution of an uncertain element (discrete probability distribution).

The estimated-time-of-arrival estimation unit 12 calculates, using the probability distribution of an uncertainty shown in FIG. 2 or FIG. 3, a probability distribution of an estimated time of arrival at a target point when the aircraft passes through a planned flight path at the current flying speed.

Figure 4:
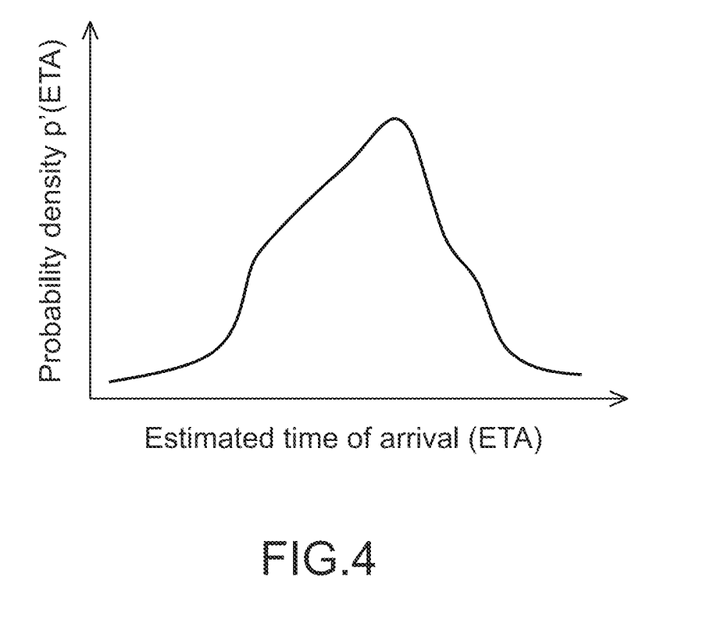
FIG. 4 is a graph showing an exemplary probability distribution of an estimated time of arrival (continuous probability distribution).

FIG. 4 shows an exemplary probability distribution of an estimated time of arrival. For example, the estimated time of arrival (ETA) in the case of a flight at the current speed (v) is calculated in each case of the weather prediction of the above N patterns (x_1, x_2, ..., x_N) (calculation results thereof are assumed to be (ETA_1, ETA_2, ..., ETA_N)), and probabilities (p'(ETA_1), p'(ETA_2), ..., p'(ETA_N)) thereof are calculated. Here, in the flight at the speed v under the weather prediction x_1, an estimated time of arrival is ETA_1, and its probability p'(ETA_1) is the probability p(x_1) in which the weather prediction is x_1. Note that FIG. 4 shows a continuous probability distribution, but a discrete probability distribution may be generated as shown in FIG. 5.

Figure 5:
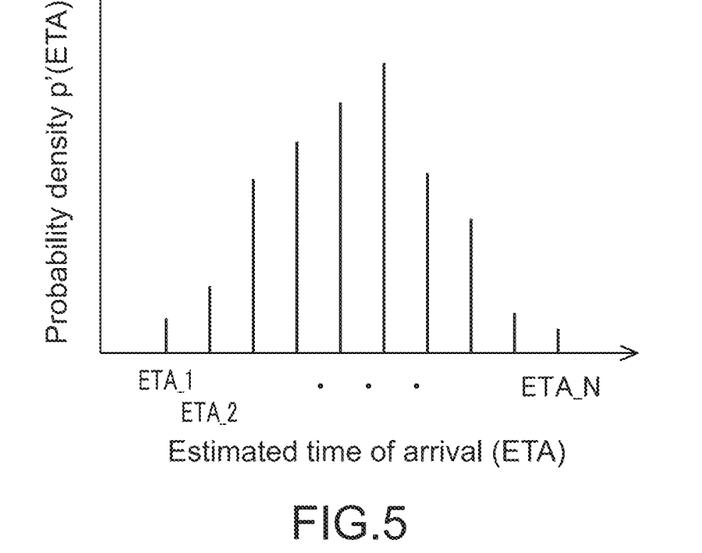
FIG. 5 is a graph showing an exemplary probability distribution of an estimated time of arrival (discrete probability distribution).

The time-of-arrival control unit 13 determines, on the basis of the probability distribution of the estimated time of arrival shown in FIG. 4 or FIG. 5, whether a statistic of the estimated time of arrival for a required time of arrival at the current flying speed v falls outside a predetermined threshold. If the statistic falls outside the predetermined threshold, the time-of-arrival control unit 13 sets the flying speed such that the statistic of the estimated time of arrival for the required time of arrival falls within the predetermined threshold. For example, as shown in the upper part of FIG. 6, a probability Pr (the area of hatched lines in the figure) that satisfies the allowable range (−tol1 to +tol2) of the required time of arrival (RTA) is used as the statistic of the estimated time of arrival (ETA) for the required time of arrival (RTA), and the probability Pr is used for threshold determination.

Figure 6:
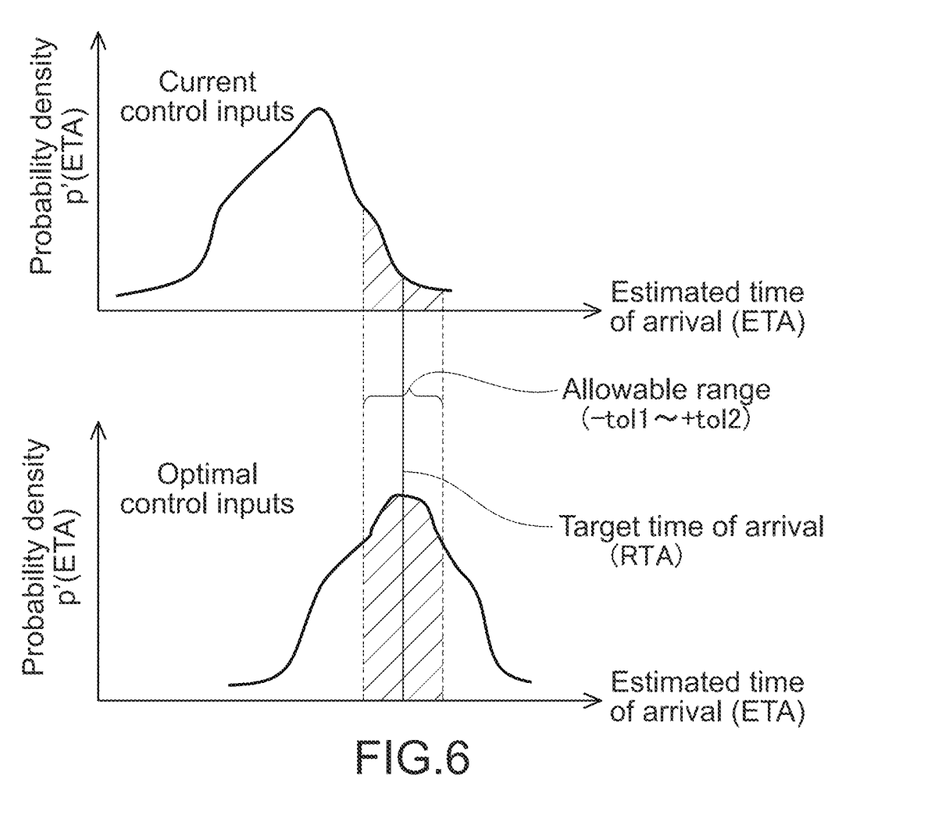
FIG. 6 is a diagram for describing the details of the processing by a time-of-arrival control unit 13 (continuous type).
Figure 7:
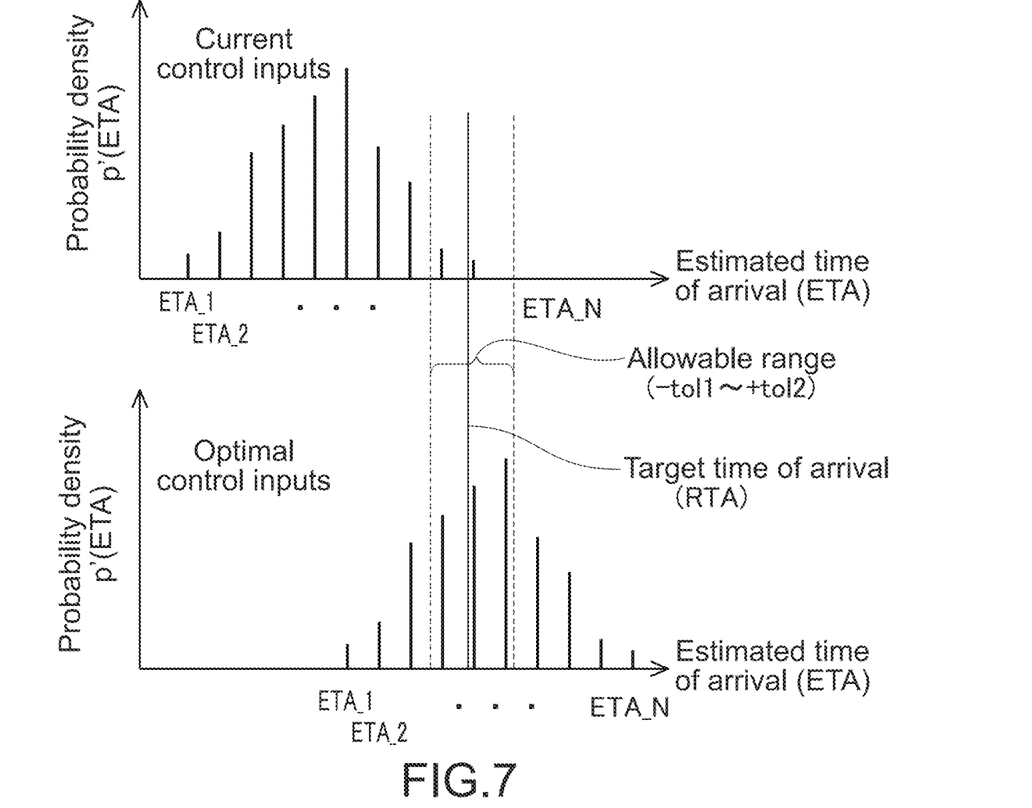
FIG. 7 is a diagram for describing the details of the processing by the time-of-arrival control unit 13 (discrete type).

If the probability Pr is equal to or smaller than the predetermined threshold, as shown in the lower part of FIG. 6, the time-of-arrival control unit 13 sets the flying speed such that the probability Pr is maximized, that is, the area of the hatched lines in the figure is maximized. Note that FIG. 6 exemplifies a continuous probability distribution, but a discrete probability distribution can also be similarly implemented as shown in FIG. 7.

For example, assuming that the flying speed is v, the estimated time of arrival is ETA, the required time of arrival is RTA, the allowable range is −tol1 to +tol2, the probability is Pr, and the probability distribution of the estimated time of arrival at a target point is p'(ETA), if the probability Pr is equal to or smaller than the predetermined threshold, the time-of-arrival control unit 13 sets a set speed vopt for maximizing the probability Pr to be maximized by the following equation (1) if it is desired to arrive at a required time of arrival, maximized by the following equation (2) if it is desired to arrive before the required time of arrival, and maximized by the following equation (3) if it is desired to arrive after the required time of arrival.

$$Pr(RTA - tol1 \leq ETA \leq RTA + tol2) = \int_{RTA-tol1}^{RTA+tol2} p'(ETA)dETA = \sum_{RTA-tol1 \leq ETA \leq RTA+tol2} p'(ETA) \quad \text{Equation (1)}$$

$$Pr(ETA \leq RTA + tol2) = \int_{-\infty}^{RTA+tol2} p'(ETA)dETA = \sum_{ETA \leq RTA+tol2} p'(ETA) \quad \text{Equation (2)}$$

$$Pr(RTA - tol1 \leq ETA) = \int_{RTA-tol1}^{+\infty} p'(ETA)dETA = \sum_{RTA-tol1 \leq ETA} p'(ETA) \quad \text{Equation (3)}$$

Figure 8:
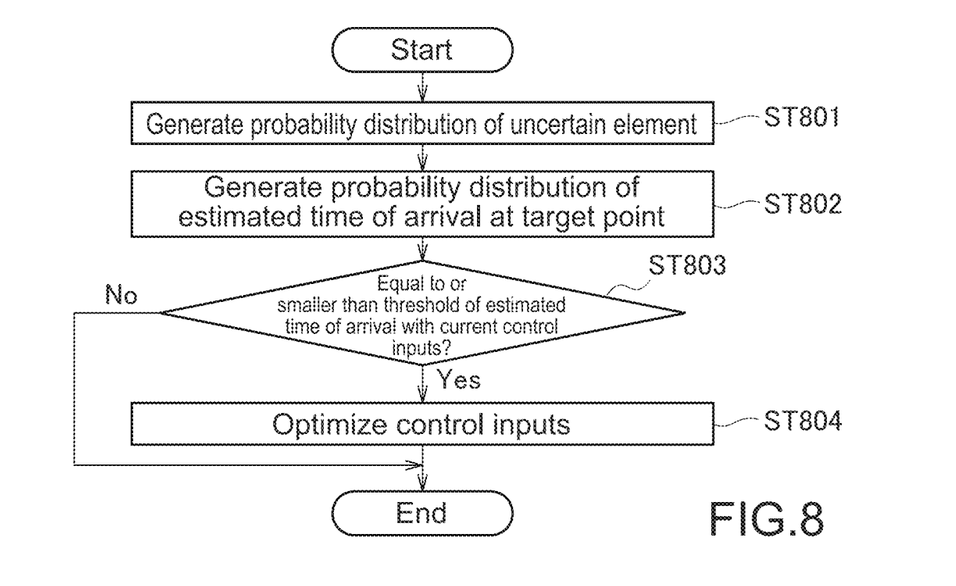
FIG. 8 is a flowchart showing an operation of the information processing apparatus 1.

FIG. 8 is a flow chart showing the operation of the information processing apparatus 1 configured as described above.

First, the uncertainty estimation unit 11 generates a probability distribution of an uncertain element (weather prediction, aircraft characteristics, etc.) during a flight (see FIG. 2 or FIG. 3) using weather observation values and aircraft measurement values during the flight (Step 801).

Next, the estimated-time-of-arrival estimation unit 12 generates a probability distribution of an estimated time of arrival at a target point (see FIG. 4 or FIG. 5) in the case of a flight with the current control inputs (speed, altitude, path angle, cost index, rate of climb and descent, etc.) using the probability distribution of the uncertain element (see FIG. 2 or FIG. 3) (Step 802).

Next, the time-of-arrival control unit 13 determines a threshold of the estimated time of arrival with the current control inputs (Step 803). In the case of falling outside the threshold, the time-of-arrival control unit 13 optimizes control inputs that satisfy a required time of arrival within an allowable range (Step 804).

Figure 9:
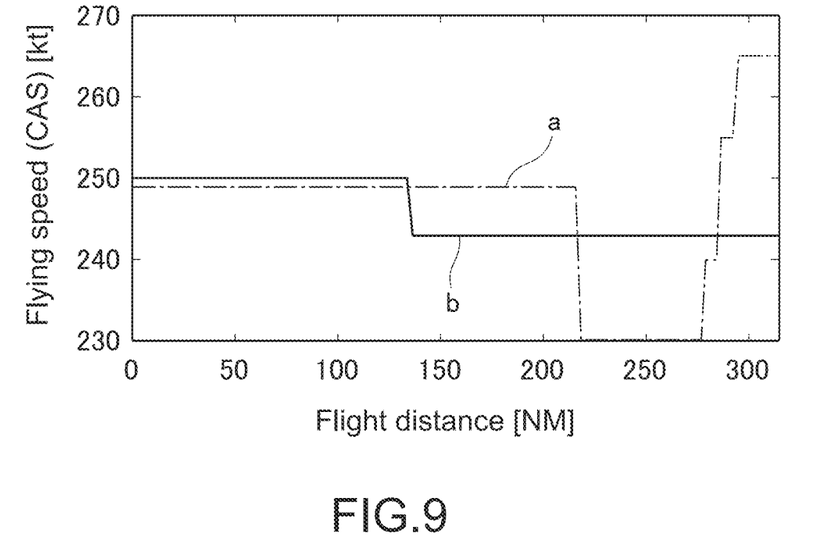
FIG. 9 is a graph for comparing the number of speed changes of the related art and that of the information processing apparatus 1 according to the present invention.
Figure 10:
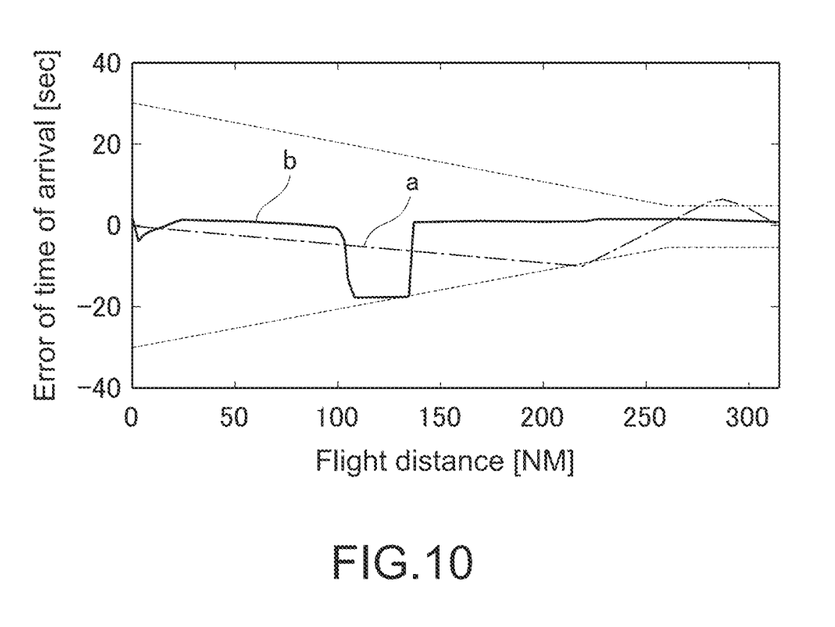
FIG. 10 is a graph for comparing the time of arrival accuracy of the information processing apparatus 1 according to the present invention and that of the related art (Part 1).
Figure 11:
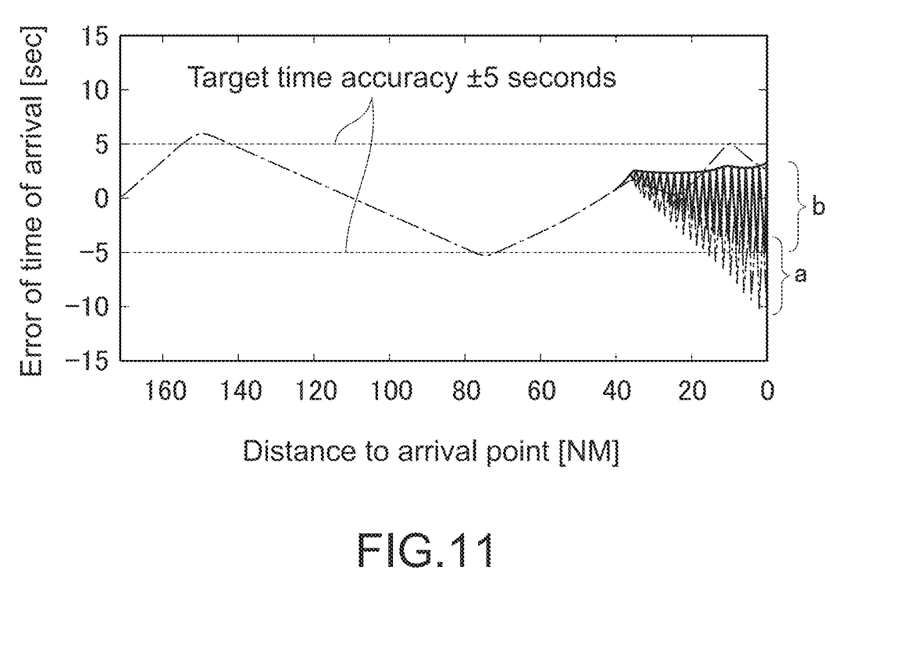
FIG. 11 is a graph for comparing the time of arrival accuracy of the information processing apparatus 1 according to the present invention and that of the related art (Part 2).

As shown in FIG. 9, the technologies proposed so far (see Patent Literatures 1, 2, etc.) frequently perform the speed adjustment (a of FIG. 9) and are thus difficult to use in the real aircraft operation. However, the information processing apparatus 1 according to the present embodiment can robustly perform required time of arrival operations on the uncertainty. Thus, the number of speed adjustments is reduced (b of FIG. 9), the comfort and the fuel efficiency are improved, and the practicality is increased. Further, the information processing apparatus 1 according to the present embodiment is improved also in error of the time of arrival (b of FIG. 10) as compared with the technologies proposed so far (a of FIG. 10) as shown in FIG. 10. Incidentally, as shown in FIG. 11, in the technologies proposed so far (a of FIG. 11), if the flight is continued at the current speed, the time of arrival largely deviates and the probability of falling within a target accuracy (e.g., target time accuracy of ±5 seconds) decreases. In the information processing apparatus 1 according to the present embodiment (b of FIG. 11), the flying speed can be set so as to maximize the probability that the time of arrival falls within the target accuracy in consideration of the influence of the error.

The present invention is not limited to the embodiment described above and can be implemented by various modifications and applications within the scope of the technical idea of the present invention, and the scope of implementation also belongs to the technical scope of the present invention.

For example, the time-of-arrival control unit according to the present invention sets the control inputs such that, if a first statistic of the estimated time of arrival with respect to the required time of arrival falls outside a first threshold that is a predetermined threshold, a second statistic of the estimated time of arrival with respect to the required time of arrival, which is different from or equal to the first statistic, falls within a second threshold, which is different from or equal to the first threshold.

Therefore, in the embodiment described above, the time-of-arrival control unit 13 sets the set speed so as to maximize the probability Pr. However, for example, the time-of-arrival control unit 13 may set, if the probability Pr is equal to or smaller than the predetermined threshold, the control inputs so as to optimize a predetermined cost under the condition that the probability Pr is set within a predetermined threshold. The optimization of the predetermined cost includes, for example, minimizing fuel consumption, but may also include other cost factors as well as the fuel consumption or may be a combination thereof.

Further, in the embodiment described above, the probability Pr that satisfies the allowable range (−tol1 to +tol2) of the required time of arrival (RTA) is used as the statistic. However, in addition to the probability Pr, moment (expected value, variance, degree of distortion, etc.), a representative value (median value, percentile value, mode value, etc.), and the like may be used for the statistic, or combinations thereof may be used therefor. For example, when an expected value is used as a statistic, the time-of-arrival control unit sets the control inputs so as to minimize the square of the difference between an expected value E[ETA] and a required time of arrival RTA as shown in the following equation (4) if the expected value E[ETA] of the estimated time of arrival (ETA) is equal to or smaller than a predetermined threshold.

$$(E[ETA]-RTA)^2 \qquad \text{Equation (4)}$$

The time-of-arrival control unit sets the control inputs so as to optimize a predetermined cost under the condition that the expected value E[ETA] is set within a predetermined threshold if the expected value E[ETA] of the estimated time of arrival (ETA) is equal to or smaller than the predetermined threshold. For example, the fuel consumption up to a target point is considered as the predetermined cost.

If it is desired to arrive at the required time of arrival: minimize fuel consumption Constraint condition: RTA-$tol1 \leq E[ETA] \leq$ RTA+$tol2$ If it is desired to arrive before the required time of arrival: minimize fuel consumption Constraint condition: $E[ETA] \leq$ RTA+$tol2$ If it is desired to arrive after the required time of arrival: minimize fuel consumption Constraint condition: RTA-$tol1 \leq E[ETA]$ The present invention can be applied not only to an implementation on an aircraft but also to an air traffic control system on the ground. In this case, when a time of arrival is specified from the ground to an aircraft, the time of arrival range that is adjustable by each aircraft is calculated on the basis of in-flight uncertainty information and a usable speed range of each aircraft, which are obtained on the ground, so that a feasible time of arrival can be set and transmitted to each aircraft. The air traffic control information processing system is integrated in such a manner, so that a plurality of aircraft can fly methodically, the foreseeing of position and time is improved, and the intervals between the aircraft are shortened. It is possible to provide an efficient descent method and high-density operation in congested airspace, provide a flight path with a high degree of freedom desired by an operator, and further minimize delay by a coordinated trajectory adjustment performed before a flight.

Further, the present invention is applicable not only to the aircraft but also to ships, trains, automobiles, and the like as long as a time of arrival is managed in the operation thereof. For example, the ships have the uncertainty such as tidal current, and the automobiles have the uncertainty such as traffic congestion. In consideration of such uncertainties in the operation or the like, the present invention can be applied to set an optimal speed.

REFERENCE SIGNS LIST 1 information processing apparatus
11 uncertainty estimation unit
12 estimated-time-of-arrival estimation unit
13 time-of-arrival control unit

The invention claimed is:

1. A non-transitory computer-readable medium storing a program causing a computer to execute the steps of:
quantifying, using an actual measured value, an uncertain predicted value that affects a time of arrival at a target point of a vehicle, and calculating a probability distribution of the uncertain predicted value;
calculating, using the probability distribution of the uncertain predicted value, a probability distribution of an estimated time of arrival at the target point when a current control input is used, the control input being a control input to the vehicle and affecting the time of arrival at the target point;
determining, in the probability distribution of the estimated time of arrival at the target point, whether a first statistic of the estimated time of arrival with respect to a required time of arrival at the target point when the current control input is used falls outside a first threshold;

setting the control input to increase a possibility that a second statistic of the estimated time of arrival with respect to the required time of arrival is within an allowable range in the probability distribution of the estimated time of arrival at the target point if the first statistic falls outside the first threshold; and transmitting the control input to the vehicle to cause the vehicle to update its trajectory as necessary to improve the time of arrival at the target point by the vehicle.

2. The non-transitory computer-readable medium according to claim 1, wherein the setting the control input includes setting the control input to increase the possibility that the second statistic is within the allowable range in the probability distribution of the estimated time of arrival at the target point and to optimize a predetermined cost, if the first statistic falls outside the first threshold.

3. The non-transitory computer-readable medium according to claim 1, wherein each of the first statistic and the second statistic is at least one of a probability, a moment, or a representative value in the probability distribution of the estimated time of arrival with respect to the required time of arrival.

4. The non-transitory computer-readable medium according to claim 1, wherein the vehicle is an aircraft, the uncertain predicted value is a weather prediction value and/or an aircraft characteristic, and the actual measured value is a weather observation value for the weather prediction value, and is an aircraft measurement value for the aircraft characteristic.

5. The non-transitory computer-readable medium according to claim 1, wherein the vehicle is an aircraft, and the control input to the aircraft is at least one of a speed, an altitude, a path angle, a cost index, and a rate of climb and descent, such that causing the vehicle to update its trajectory as necessary to improve the time of arrival at the target point by the vehicle comprises causing the vehicle to update at least one of a speed of the vehicle, an altitude of the vehicle, a path angle of the vehicle, a cost index of the vehicle, and a rate of climb and descent of the vehicle.

6. The non-transitory computer-readable medium according to claim 1, wherein the vehicle is an aircraft, a ship, a train, or an automobile.

7. The non-transitory computer-readable medium according to claim 1, wherein the vehicle is an aircraft, and wherein transmitting the control input to the vehicle comprises first transmitting the control input to a grounded air traffic control system, which then transmits the control input to the vehicle.

8. A computer, comprising:

an uncertainty estimation unit that quantifies, using an actual measured value, an uncertain predicted value that affects a time of arrival at a target point of a vehicle, and calculates a probability distribution of the uncertain predicted value;

an estimated-time-of-arrival estimation unit that calculates, using the probability distribution of the uncertain predicted value, a probability distribution of an estimated time of arrival at the target point when a current control input is used, the control input being a control input to the vehicle and affecting the time of arrival at the target point; and a time-of-arrival control unit that determines, in the probability distribution of the estimated time of arrival at the target point, whether a first statistic of the estimated time of arrival with respect to a required time of arrival at the target point when the current control input is used falls outside a first threshold, sets the control input to increase a possibility that a second statistic of the estimated time of arrival with respect to the required time of arrival is within an allowable range in the probability distribution of the estimated time of arrival at the target point if the first statistic falls outside the first threshold, and transmits the control input to the vehicle to cause the vehicle to update its trajectory as necessary to improve the time of arrival at the target point by the vehicle.

9. The computer according to claim 8, wherein the vehicle is an aircraft, a ship, a train, or an automobile.

10. The computer according to claim 8, wherein the vehicle is an aircraft, and wherein the control input to the aircraft is at least one of a speed, an altitude, a path angle, a cost index, and a rate of climb and descent, such that causing the vehicle to update its trajectory as necessary to improve the time of arrival at the target point by the vehicle comprises causing the vehicle to update at least one of a speed of the vehicle, an altitude of the vehicle, a path angle of the vehicle, a cost index of the vehicle, and a rate of climb and descent of the vehicle.

11. The computer according to claim 8, wherein the vehicle is an aircraft, and wherein transmitting the control input to the vehicle comprises first transmitting the control input to a grounded air traffic control system, which then transmits the control input to the vehicle.

12. An information processing method, comprising:

quantifying, using an actual measured value, an uncertain predicted value that affects a time of arrival at a target point of a vehicle, and calculating a probability distribution of the uncertain predicted value;

calculating, using the probability distribution of the uncertain predicted value, a probability distribution of an estimated time of arrival at the target point when a current control input is used, the control input being a control input to the vehicle and affecting the time of arrival at the target point;

determining, in the probability distribution of the estimated time of arrival at the target point, whether a first statistic of the estimated time of arrival with respect to a required time of arrival at the target point when the current control input is used falls outside a first threshold; and setting the control input to increase a possibility that a second statistic of the estimated time of arrival with respect to the required time of arrival is within an allowable range in the probability distribution of the estimated time of arrival at the target point if the first statistic falls outside the first threshold; and transmitting the control input to the vehicle to cause the vehicle to update its trajectory as necessary to improve the time of arrival at the target point by the vehicle.

13. The information processing method according to claim 12, wherein the vehicle is an aircraft, a ship, a train, or an automobile.

14. The information processing method according to claim 12, wherein the vehicle is an aircraft, and wherein the control input to the aircraft is at least one of a speed, an altitude, a path angle, a cost index, and a rate of climb and descent, such that causing the vehicle to update its trajectory as necessary to improve the time of arrival at the target point by the vehicle comprises causing the vehicle to update at least one of a speed of the vehicle, an altitude of the vehicle, a path angle of the vehicle, a cost index of the vehicle, and a rate of climb and descent of the vehicle.

15. The information processing method according to claim 12, wherein the vehicle is an aircraft, and wherein transmitting the control input to the vehicle comprises first transmitting the control input to a grounded air traffic control system, which then transmits the control input to the vehicle.

* * * * *